(12) United States Patent
Plummer

(10) Patent No.: US 7,926,942 B2
(45) Date of Patent: Apr. 19, 2011

(54) SOLID STATE LENSES AND LENS COMPONENTS

(75) Inventor: William T. Plummer, Concord, MA (US)

(73) Assignee: WTP Optics, Inc., Concord, MA (US)

( * ) Notice: Subject to any disclaimer, the term of this patent is extended or adjusted under 35 U.S.C. 154(b) by 42 days.

(21) Appl. No.: 12/540,575

(22) Filed: Aug. 13, 2009

(65) Prior Publication Data
US 2009/0323177 A1    Dec. 31, 2009

Related U.S. Application Data

(62) Division of application No. 11/410,776, filed on Apr. 25, 2006, now Pat. No. 7,591,557.

(51) Int. Cl.
G02C 7/02 (2006.01)
B29D 11/00 (2006.01)

(52) U.S. Cl. .......... 351/177; 264/1.1; 264/1.32

(58) Field of Classification Search ......... 264/1.1, 264/1.32; 351/177
See application file for complete search history.

(56) References Cited

U.S. PATENT DOCUMENTS

| | | | |
|---|---|---|---|
| 3,131,025 A | 4/1964 | Carnall, Jr. et al. | |
| 3,206,279 A | 9/1965 | Smith | |
| 3,359,066 A | 12/1967 | Hatch et al. | |
| 3,794,704 A | 2/1974 | Strong | |
| 4,013,796 A | 3/1977 | Swinehart et al. | |
| 4,014,965 A * | 3/1977 | Stube et al. | 264/443 |
| 4,146,379 A | 3/1979 | Copley et al. | |
| 4,217,318 A | 8/1980 | Anderson | |
| 4,282,024 A | 8/1981 | Copley et al. | |
| 4,528,325 A | 7/1985 | Ofstead | |
| 4,618,649 A | 10/1986 | Ofstead | |
| 4,694,037 A | 9/1987 | Ofstead | |
| 4,992,302 A | 2/1991 | Lindmayer | |
| 5,397,511 A | 3/1995 | Ishihara et al. | |
| 5,702,657 A * | 12/1997 | Yoshida et al. | 264/112 |
| 5,759,988 A | 6/1998 | Heile et al. | |
| 6,280,662 B1 | 8/2001 | Beratan et al. | |
| 6,927,899 B2 | 8/2005 | Daigle | |
| 2002/0084023 A1 | 7/2002 | Yamamoto et al. | |

OTHER PUBLICATIONS

Tosi, Jeffery L., "Common Infrared Optical Materials: A Guide to Properties and Applications", Photonics Handbook, pp. H-357-H-367 (2005).
PCT/US06/15675 International Search Report and Written Opinion mailed on Oct. 10, 2006.

* cited by examiner

Primary Examiner — Joseph Martinez
Assistant Examiner — James R Greece
(74) Attorney, Agent, or Firm — Francis J. Caufield

(57) ABSTRACT

Solid state lenses, lens blanks, and lens components comprising compressible materials ground into fine powders having mechanical properties that make them capable of being formed into cohesive monolithic masses that are low in scattering. The fine powders may be admixtures of host matrix materials and others which, when combined, provide preferred optical properties such as index and dispersion. Parts possessing transmission from within the range from the ultraviolet to the infrared are possible. The materials are suited to low temperature formation of aspheric lenses transmissive in the near and far IR.

25 Claims, 3 Drawing Sheets

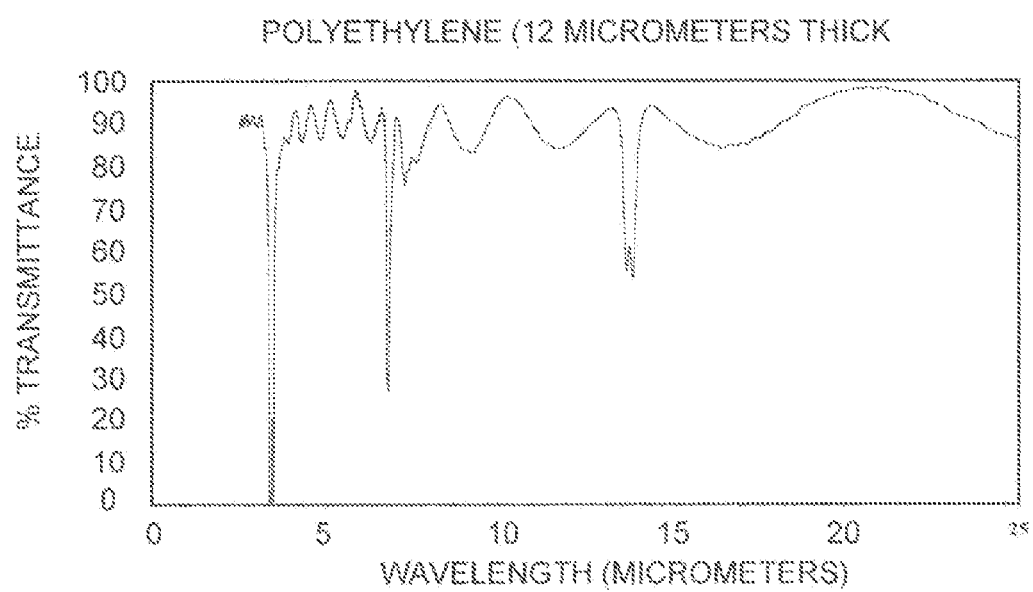
FIG. 4
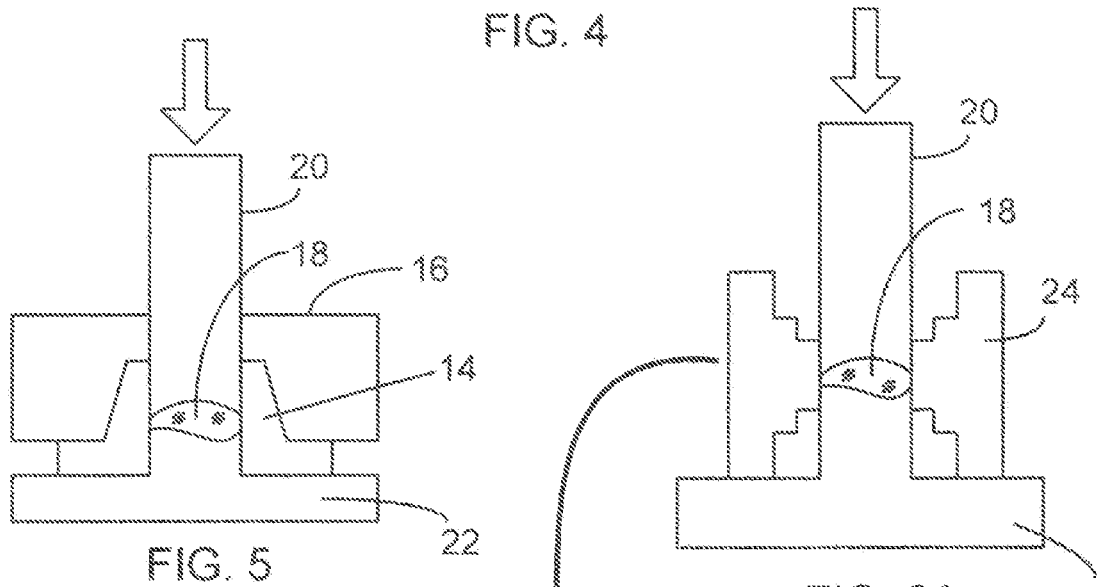
FIG. 5
FIG. 6A
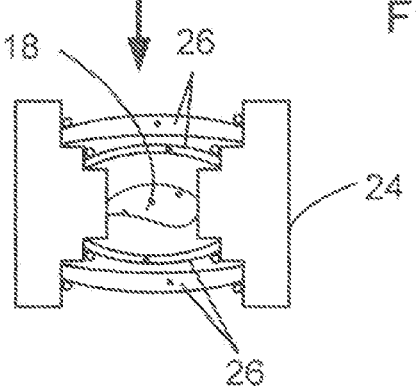
FIG. 6B

SOLID STATE LENSES AND LENS COMPONENTS

CROSS-REFERENCE TO RELATED APPLICATION

This application is a divisional of U.S. patent application Ser. No. 11/410,776 filed on Apr. 25, 2006 in the name of William T. Plummer and entitled SOLID STATE METHOD AND APPARATUS FOR MAKING LENSES AND LENS COMPONENTS, the entire contents of which are incorporated herein by reference.

FIELD OF THE INVENTION

This invention in general relates to solid state methods and apparatus for manufacturing lenses, lens blanks, and lens components and more particularly, to low temperature fabrication of aspheric lenses designed for the transmission of ultraviolet, visible and/or infrared light.

BACKGROUND AND INVENTION

Traditional lens grinding and polishing technologies can most easily make optical surfaces that are portions of spheres or simple flats. (Strong, John, Procedures in Experimental Physics, Chapter 11, Prentice-Hall, New York (1938).) When a crude spherical surface is rubbed repeatedly and randomly against a matching crude spherical surface, with the interface filled with a slurry of small abrasive particles, irregularities are worn off, and both surfaces become more accurately spherical. The natural ease by which spherical optical surfaces can be made was also expressed by F. Twyman, Prism and Lens Making, Hilger and Watts, London (1952), and by D. F. Horne, Optical Production Technology, Crane Russak, New York (1972).

Many examples can be listed in which the performance of an optical system is improved through the use of one or more non-spherical refractive surfaces. "An aspheric surface can be a powerful design tool for the reduction of residuals or the elimination of primary aberrations (especially distortion, astigmatism, and spherical) which will yield to no other design techniques." (Smith, Warren J., Modern Optical Engineering, page 351, McGraw-Hill, New York (1966).) But as Smith puts it, "Aspherics, cylinders, and toroids do not share the universality of the spherical surface, and their manufacture is difficult. While a sphere is readily generated by a random grinding and polishing (because any line through the center is an axis), optical aspherics have only [at most] one axis of symmetry. Thus, the simple principle of random scrubbing which generates a sphere must be replaced by other means.

An ordinary spherical optical surface is a true sphere to within a few millionths of an inch. For aspherics this precision can only be obtained by a combination of exacting measurement and skilled hand correction." (Op. cit., page 413.) "In almost all cases, the designer is restricted to the use of spherical refracting or reflecting surfaces, regarding the plane as a sphere of infinite radius. The standard lens manufacturing processes generate a spherical surface with great accuracy, but attempts to broaden the designer's freedom by permitting the use of nonspherical, or "aspheric", surfaces lead to extremely difficult manufacturing problems; consequently such surfaces are used only when no other solution can be found." (Kingslake, R., Lens Design Fundamentals, Academic Press, New York (1978).)

The extra work required to generate and polish an accurate aspheric surface may be worthwhile if that surface can be used as part of a mold, to manufacture large numbers of lenses with the desired non-spherical shape. Aspheric lenses, Fresnel lenses, and diffractive optical elements are commonly manufactured for special system requirements by injection or compression molding of thermoplastic optical polymers such as PMMA, polystyrene, or polycarbonate, or by casting a transparent epoxy or thermoset material in such an aspheric mold. But, unless the optical components are quite thin, such polymers are severely limited in their infrared transmission, typically to less than 1.7 microns wavelength, by molecular resonance bands, and may be limited to 0.300 microns wavelength or longer in the ultraviolet.

Examples of polymer spectral transmission measurements can be found in the USPL Handbook of Plastic Optics (United States Precision Lens, Cincinnati, second edition, p. 20 (1983).) (Also see: http://www.gsoptics.com/custom_optics-lcharts.html (illustration copied here) and http://www.ircon.com/pdf/wtn100.pdf for transmission data for popular plastics, and FIG. 2)

There are also moldable glasses that can be used for manufacturing aspheric lenses, such as those available from LightPath Technologies, Inc. (Geltech) of Orlando, Fla., but these materials are also severely limited in their infrared and ultraviolet spectral transmission range.

In addition, there are many exotic crystals, alloys, and other materials available that can be ground and polished for use as lenses, many of them transparent across much larger parts of the infrared and ultraviolet spectrum, but these materials are not considered to be suitable for volume manufacture by molding in any of the usual ways, and some of them are quite expensive to obtain as raw material. (Tosi, J. L., Optical Materials: Making the Right Choice in the IR, in The Photonics Handbook, p. 391 ff., Laurin Publishing, Pittsfield, Mass. (2003).) Aspheric optical components can be made from some of these crystalline and amorphous alloy materials by Computer-Numerical-Control diamond surface cutting or grinding, or by skilled use of the older manual grinding and polishing procedures mentioned by Strong (op. cit.) and by Smith (op. cit.), but all of these processes may be too slow and expensive for economical high-volume production.

Tosi (op. cit.) characterized the wide range of physical properties of the useful infrared optical materials, about half of which are chemically alkali or other metal halides. Most of them can be ground and polished optically as if they were glass, but there are significant differences. Some are quite brittle, some fracture easily when their temperature is changed, some corrode the materials in contact with them, some melt at very high temperatures, and some decompose before melting if they are heated. They cannot be molded in the manner of thermoplastic resins and cannot easily be cast in desired shapes.

The only infrared optical materials commonly thought to be 'moldable' to non-spherical component shapes are the two comparatively heavy and expensive proprietary chalcogenide glasses, $Ge_{22}As_{20}Se_{68}$ and $Ge_{20}Sb_{15}Se_{65}$, available commercially from Umicore, a European company. These materials are chemically similar to AMTIR-1 in Tosi's list.

Consequently, it is a primary object of this invention to provide solid state methods, materials, and apparatus by which lenses, lens blanks, and lens components useful in transmitting ultraviolet, visible, and/or infrared light.

It is another object of this invention to provide methods, materials, and apparatus by which lenses, lens blanks, and lens components can be formed at temperatures within the range from approximately room temperature to less than the melt temperatures of the materials.

It is yet another object of this invention to provide aspheric lenses and lens components fabricated with solid state, low temperature processes from specially prepared powders.

It is another object of this invention to provide protective barriers and methods for protecting lenses formed in the solid state against moisture and other environmental effects.

It is another object of this invention to provide materials that can be ground into powders suitable for forming lenses, lens blanks, and lens components by compressing them into cohesive monolithic solids at temperatures less than their melt temperatures.

Other objects of the invention will, in part, appear hereinafter and, in part, be obvious when the following detailed description is read in connection with the drawings.

SUMMARY OF THE INVENTION

The present invention is directed to methods, materials, and apparatus for manufacturing lenses in the solid state, preferably at low temperatures. Essentially, the method involves a solid state near room temperature process in which deformable powder particles are squeezed together so well under compression that they nearly fill the volume available to them, cling together in the form of a solid, and pass a reasonable amount of radiation without scattering it. The powders are ground from suitable optical materials that provide transmission of ultraviolet, visible and/or infrared light and possess the capability of being formed into a solid cohesive mass having low absorption and scattering over the desired operating wavelength region of the final lens or component.

The inventive method includes grinding optical materials into powder form and placing the materials into a compression die shaped according to a predetermined lens, blank, or component profile. After closing the die, sufficient mechanical pressure is applied to form the lens while vacuum pressure is preferably applied to remove residual air from the compressed powder. The events that occur in the process of compression are believed to be: (1) transitional repacking, (2) deformation powder components at points of contact, (3) fragmentation and/or deformation, (4) bonding, (5) deformation of the solid body, (6) decompression, and (7) ejection.

Admixtures of a suitable host matrix material and other materials having preferred optical properties may be used to achieve, for example, desired index of refraction and dispersion. The powder nanoparticles are preferably less than about one-tenth of the smallest wavelength within the operating wavelength range of the final lens. For use in the infrared, the particles can be estimated to be small enough when they do not have any facets, in the case of crystalline powders, that specularly reflect glints of visible light.

Host matrix materials and IR materials may be selected from the alkali or other metal halides, and potassium bromide is particularly suitable.

The method may be used to fabricate blanks of suitable hardness from which lenses can be fabricated by conventional machining techniques.

Protective barriers such as a thin films, e.g., Saran® may be applied afterwards to inhibit moisture and other environmental effects.

BRIEF DESCRIPTION OF THE DRAWINGS

The structure, operation, and methodology of the invention, together with other objects and advantages thereof, may best be understood by reading the following detailed description in connection with the drawings in which each part has an assigned numeral or label that identifies it wherever it appears in the various drawings and wherein:

FIG. 4 is a graph showing the transmission characteristics of PE ("Premium") Saran film;

FIG. 5 is a drawing showing the use of a removable liner between the die set and a lens; and FIGS. 6a and 6b are drawings showing the use of a die body itself as a mount for a compound lens system.

DETAILED DESCRIPTION

Central to this invention is the realization that lenses, either spherical or aspheric in shape, can be formed usefully and economically in the solid state, preferably at or near room temperature, from many useful materials by a novel use of a well-known technique, a method that is commonly used by infrared spectroscopists to embed powdered chemical samples in a flat solid matrix for spectroscopic examination, but a method that is apparently not known for use in making lenses, lens blanks or lens components.

In this conventional technique, a metal die set is assembled to hold a dried powdered matrix host material, such as potassium bromide or other metal halide material, and constrain it to prevent lateral spreading. The matrix host material has added to it a small percentage of material to be spectroscopically analyzed. Most of the air is removed from the powder with a simple vacuum pump. The flat-faced metal die is firmly compressed to consolidate all of the powder into a solid mass, which becomes reasonably clear like a small window.

Figure 1:
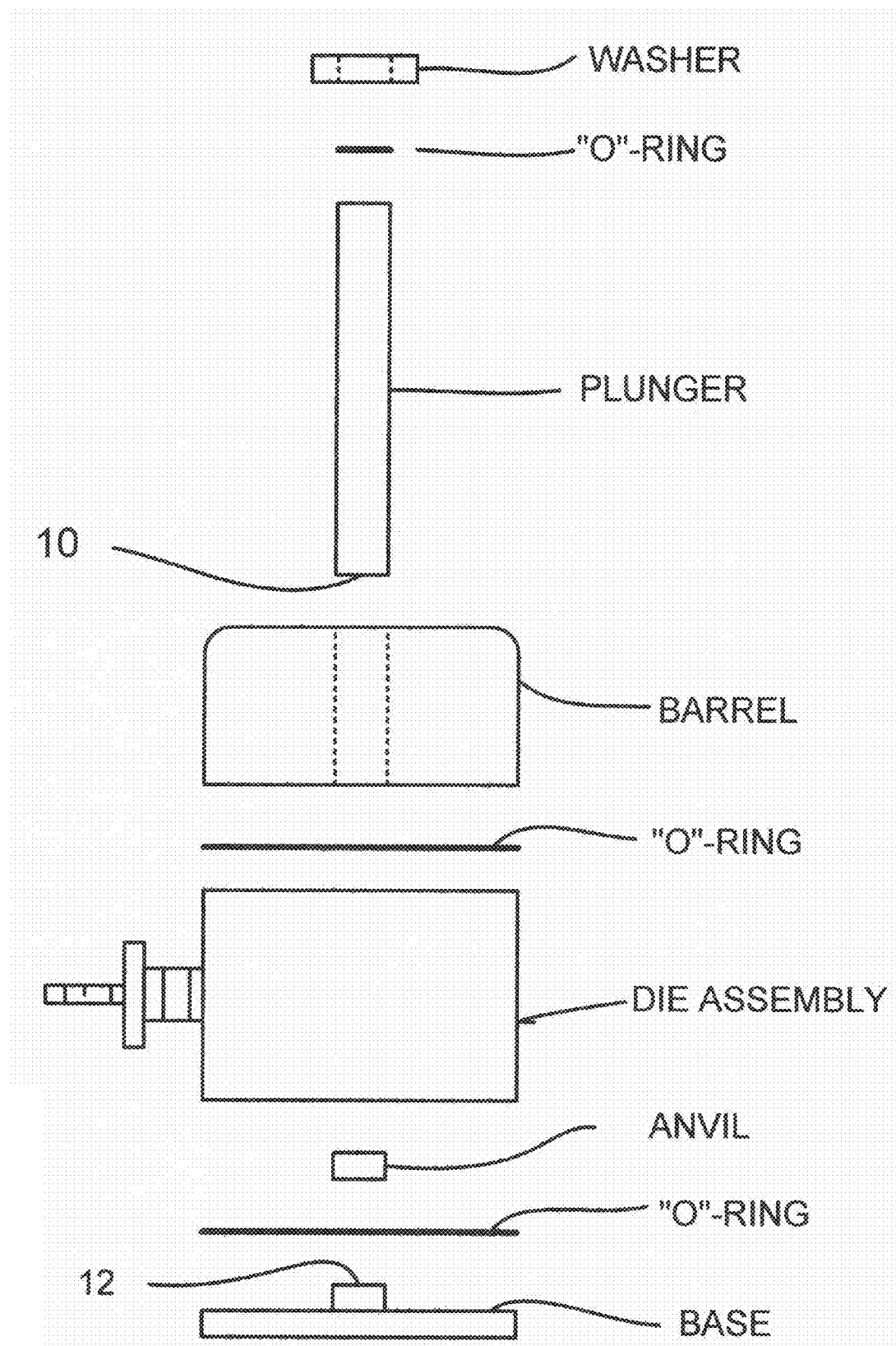
FIG. 1 is a diagrammatic elevational view of commercial die set that is readily modifiable to practice the invention.
Figure 2:
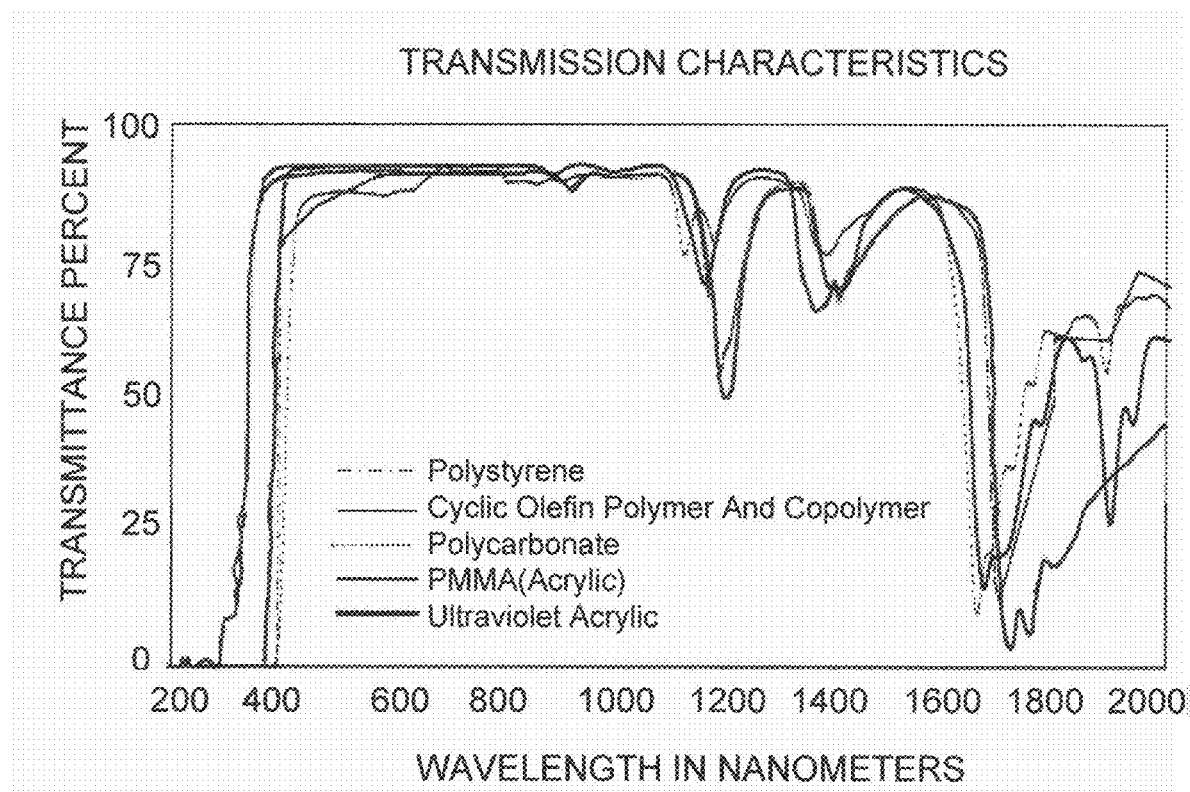
FIG. 2 is a graph showing the transmission characteristics of various polymers.

FIG. 1 from Sigma-Aldrich Corporation, St. Louis, Mo., shows the simple elements of one commercial die set used for forming transparent sampling pellets of potassium bromide and other alkali halides for infrared spectroscopy. I propose using a die set similar to this, but modifying it so that the plunger and base facing surfaces shown as 10 and 12, respectively, carry spherical or aspherical shapes to aid in the formation of lens or lens components.

These are the specific steps typically suggested for forming a potassium bromide optical sampling pellet in this classical way with the commercially available equipment, and these can be used in modified form to carry out my invention as well. They are to:

1. Select a material that will serve as a host matrix or serve as the final material composition (e.g. potassium bromide) of the desired optical component or lens and select with it as needed another material to alter the optical properties of the host material to satisfy the design requirements of the final product;

2. Individually grind the material(s) of step 1 with an agate or alumina mortar and pestle until there is no (visible) evidence of crystals in the powder. Preferably the powdery nanoparticles will be less than about one-tenth the wavelength ($\lambda/10$) of the smallest wavelength within the operating wavelength range of the product. As will be appreciated, powders of fine particles may also be formed by mashing, abrading, attriting, subliming, melting and spraying, and dissolving and spraying.

3. Dry the material(s) in an oven at 110° C. for 12 hours and store them in a desiccator until they are needed.

4. Warm the compression plunger die and anvil slightly to be sure that they are dry.
5. Gently and thoroughly mix weighed amounts of the material(s) and put the proper quantity into the open die set to form a pellet of the proper thickness.
6. Put the compression die set together with a small amount of mechanical pressure and pull a vacuum on it for one to two minutes to remove any residual air.
7. Continue pumping the vacuum while applying 40,000 to 60,000 pounds/square inch of pressure for two minutes.
8. Release the vacuum, then release the mechanical pressure.
9. Take apart the die set.
10. Push the finished compacted object out of the die set body.

For conventional spectrometric sampling, the material to be studied is thoroughly but gently mixed with the potassium bromide after step (3), with a relative concentration of 0.1 to 2%. Although potassium bromide is the most popular material used in this way, potassium chloride, cesium iodide, and high-density polyethylene, are also suggested for student use in forming sample pellets by the Keck Interdisciplinary Surface Science Center at Northwestern University.

Both Buck Scientific Corporation of East Norwalk, Conn., and International Crystal Laboratories of Garfield, N.J., offer a commercial hand-held Quick Press, accessories, and instructions for making pellets up to 7 mm diameter. The Sigma-Aldrich Corporation of St. Louis, Mo., offers a commercial "Aldrich KBr Die" suitable for making pellets up to 13 mm diameter, and suggests that pressures of 25,000 to 40,000 pounds per square inch will be suitable for making clear pellets of potassium bromide, thallous bromide, or cesium iodide. Commercial apparatus for using this technology has been available from these and other suppliers for more than forty years. This process of forming a solid disk by mechanical compression of a mixture of a powdered sample with powdered potassium bromide has been accepted as a standard procedure for analytical infrared spectroscopy (Reagent Chemicals: American Chemical Society Specifications, Official from Jan. 1, 2000, Ninth Edition, American Chemical Society and Oxford University Press, New York (2000) p. 78). (See, for example:
http://www.sigmaaldrich.com/img/assets/3762/al_techbul-l_al191.pdf,
http://www.nuance.northwestern.edu/KeckII/ftir4.asp,
http://www.chemistry.nmsu.edu/Instrumentation/KBr_New2.html,
http://www.thomasregister.com/olc/10493500/irsolid2.htm,
http://www.internationalcrystal.net/icl70.htm,
http://www.columbia.edu/ccnmtl/draft/dbeeb/chem-udl/solid_sampling.html,
http://www.internationalcrystal.net/ti_sec6.htm and its following pages.)

While certain host materials have been identified for use in conventional processes, others may serve for the purposes of the present invention. What is required is a host material that has the capability of being formed into a solid cohesive mass having low absorption and scattering over the desired operating wavelength region of the final lens or component. The host material will also have sufficient binding properties to enable it to have other optical materials added to it in sufficient concentrations to provide desired design optical properties while at the same time permitting the final product to remain essentially solid for its intended use. That is, the final compressed product should be capable of being self-supporting in use and therefore be of monolithic form. Materials of needed optical properties that are also high in cohesive surface energy density would be suitable candidates since small particles of them tend to cohere with one another when brought into proximity under pressure.

When the conventionally flat surfaces of the compression die (the plunger and anvil) are replaced with optical tools fabricated and polished with any desired optical shape, a lens can be satisfactorily and advantageously formed in much the same way as is commonly used to form the flat solid sampling pellet matrix. Those optical forming tools can be ground and polished to any chosen form and optical finish on a stainless steel blank, or can be diamond-cut in a suitable nickel alloy plated onto a steel substrate. Both methods are familiar from common use in making both spherical and aspheric injection molding tools for polymers, and have been available commercially for more than 30 years. (Plummer, W. T., "Unusual Optics of the Polaroid SX-70 Land Camera" Appl. Optics 21(2), 196-202 (1982), and Plummer, W. T., J. J. Mader, J. W. Roblee, and J. Van Tassell, "Precision Engineering at Polaroid" Proc. of the Pre-Conf. Day, pp. 24-29, Precision Engineering in Industry—International State of the Art, Eighth Int. Precision Eng. Seminar, Université de Technologie de Compiègne, France; M. Bonis, et al., Ed. (May 15, 1995)) Machines capable of generating spherical and aspheric lens mold shapes with the necessary mathematical complexity and accuracy on a hard and tough surface are available from the Moore Tool Company of Bridgeport, Conn., and from Precitech, Inc., of Keene, N.H., and for use at the longer infrared wavelengths, a mechanically ground or lathe-turned optical finish may be adequate for present purposes without further polishing. Of course, as in a common polymer molding practice, the master shape can be generated first in a soft material, such as a plastic or an easily machined metal, then converted into a hard mold component by nickel electroforming replication.

Figure 3:
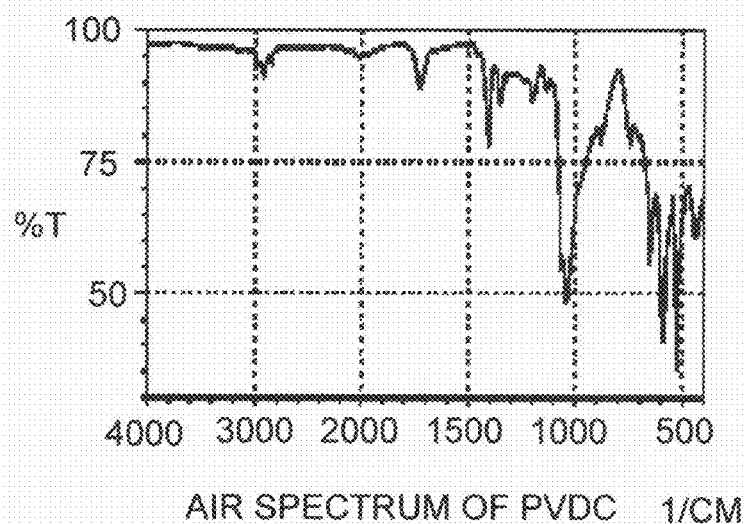
FIG. 3 is a graph showing the transmission characteristics of PVDC ("Classic") Saran film.

One specific "lens component" that can usefully be manufactured by the invention is an array of many small lenses, such as spherical or aspheric lenses arranged in a square or hexagonal array, or an array of many cylindrical lenses lying parallel to each other on a surface. A nickel tool will work well for this purpose and may be made by electroforming from a master of the correct shape formed in any convenient material. One example is the ruled patterns of cylindrical lenses depicted in FIGS. 3 and 4 of U.S. Pat. No. 3,848,980 by Plummer and incorporated herein in its entirety by reference. Diffractive structures such as those depicted in U.S. Pat. No. 5,260,828 by Londono, et al. that may be used for athermalization, achromatization, or beam splitting can also be usefully manufactured in this way. The '828 patent is also incorporated herein in its entirety by reference. Another diffractive structure that can be manufactured in this way might be a diffraction grating, or might be a computer-generated surface-relief transmission hologram formed by use of a mechanical, microlithographic, or laser-scanned photo polymerization fabrication process, preferably followed by an electroforming step to make a durable molding tool. Such a hologram may be used for projecting or displaying a desired optical or infrared image. The lens that can be manufactured with this powder compacting technology can also be a Fresnel lens, or indeed, almost any optical component that can be molded of thermoplastic polymers using traditional hot methods. The "lens component" can further be an axicon, or other refractive or diffractive component as might be designed for producing a Bessel (non-spreading) beam of radiation, or can be a prism, or a joined cluster of prisms.

The necessary forming pressure of 25,000 to 60,000 psi for practicing this new lens-fabrication art can be achieved easily for small lenses with a tabletop press, such as a 3-ton arbor press, or with a larger metal-forming press, or even with the fast-acting mold containment clamp of a conventional injection-molding machine. To provide the necessary pressure for consolidating powder to make a larger-diameter spherical or aspheric lens, the required compression force will scale approximately as the projected area of the compression die, so a clamping force of 300 tons will be required to form a lens of 3" to 4" diameter. Suitable presses with a force capacity of 2000 tons or more are readily available from sources such as the Beckwood Press Co. of St. Louis, Mo. A little less force or time may be needed if the powder is heated moderately above room temperature, but melting is not necessary, and some of these materials may decompose at high temperature. Because the powder will not flow laterally as easily as a liquid, more force will be needed if there is significant thickness variation across the area of the lens.

The pressure and time for the process must be sufficient to collapse the spaces between the powder grains to an insignificant size for optical scattering, preferably to a dimension no more than 1% to 10% of the intended wavelength, and thereby reduce the compressed mass to a homogeneous and essentially clear optical lens. The optical forming tools may be over-plated as necessary with any tough and sufficiently inert material to avoid corrosion by contact with the metal halide, or the tools themselves may be made of more corrosion-resistant materials by grinding and polishing glass, fused silica, or a hard ceramic instead of the stainless steel that is more commonly used for polymer molding. Even an injection-molded polymer shape may be usable in the cylinder as a forming tool if it is placed between the plunger or the anvil and the powder; the polymer would be more subject to mechanical wear than metal or ceramic, but would be inexpensive enough to discard after one use.

One way to maintain a nearly uniform thickness across the area of the compacted powder is to insert into the press a pre-made transparent lens, with spherical surfaces finished in a conventional way, between the powder and either the plunger or the anvil, such that the inserted lens provides most of the thickness variation. The compression surface that holds the back of the pre-made lens is fitted to it to distribute the high pressure evenly and avoid breakage. After the compression has solidified the powder, the pre-made lens and the consolidated powder are then treated as a single object when they are removed from the cylinder and mounted in an optical system.

Potassium bromide itself, the substance most commonly used as a matrix for spectroscopy, is usable itself as a finished optical component with transmission from about 0.22 micron wavelength in the ultraviolet to nearly 30 microns in the infrared. Other metal halide materials such as cesium iodide can be selected for use from 0.2 microns through 50 microns. (The Photonics Handbook, Laurin Publishing, Pittsfield, Mass. (2003) p. 20)

Additionally, some metal halides such as silver chloride can be formed first as a flexible and ductile sheet, handled much like sheet lead, that can subsequently be formed into a lens, or other optical element of almost any desired surface shape, simply by compression-forming it between generated and polished optical molding tools, much as a coin is struck between figured dies. If a sufficiently smooth sheet of metal halide is used as the raw material, the lens can be formed quickly and easily at or near room temperature by pressure alone. Depending on the materials, temperatures ranging from room to less than the material melt temperatures can be used to practice the invention. Essentially any temperature at which the materials are in their solid state is possible. For convenience and ease of use, it is preferred to practice the invention within the temperature range from 40° F. to 520° F., and most preferably within +/−20° F. of room temperature.

It is further noted that this same lens fabrication art can be used to achieve useful new options in the optical materials from which a lens can be made. Because the metal halides have excellent matrix-forming properties when compressed, they can be used to make a variety of new materials that are mixtures of one or more metal halides with one or more other substances having different optical properties. If such other substances are ground or otherwise pulverized to small particles, ideally having diameters of 1% to 10% of the wavelength of the optical or infrared radiation to be passed, then Rayleigh and Mie scattering can be made small. (Van de Hulst, H. C., Light Scattering by Small Particles, John Wiley & Sons, New York (1957).) For particles much smaller than the wavelength of light, the amount of scattering will be reduced with the sixth power of the particle size, so undesired scatter can be effectively controlled in this way. Acceptable particle diameters can still measure 100 to 1000 or more atomic spacings across, and thus each particle may contain between a million and a billion atoms. But, the particles will still be so small and so numerous that a large number of each kind of particle will be found within any local cubic-wavelength-sized volume element of the composite material.

Such a hybrid material will not be a true optical glass, in which the components are mutually melted, dissolved, and intermixed to the molecular size level, but it will in most optical respects perform as if it were a true glasslike optical material. In particular, its collective refractive index represents an "average" that may be calculated from those of its constituents by use of the familiar Lorentz-Lorenz formula. (See Jenkins, F. A., and H. E. White, Fundamentals of Optics, Second Edition, page 251, McGraw-Hill, New York (1950).) The Lorentz-Lorenz formula is equivalent to the Clausius-Mossotti equation encountered in the microscopic theory of dielectrics; see Reitz, J. R., and F. J. Milford, Foundations of Electromagnetic Theory, Addison-Wesley, Reading, Mass. (1960).) The combined refractive index n of the inventive hybrid compacted material can be represented fairly well by noting that the Lorentz-Lorenz ratio $P=(n^2-1)/(n^2+2)$ for the combination is the average, weighted by volumetric proportion $Vi/V$, of all the Pi values separately calculated for all the individual constituents. That is, $P=\Sigma Vi\ Pi$, where $\Sigma Vi/V=1$, where we perform the sum over the two or more substances being combined. This quantity P, and from it the calculated combined refractive index n, can be calculated for any useful wavelength in our extended spectral range. Unlike a true glass, in which the constituents must exhibit a high degree of chemical compatibility for a stable product, these "pseudo glasses" have only about one ten-thousandth to one millionth the interacting surface area between one constituent and another, and can therefore exhibit fewer problems with incompatibility. The "other substances" can therefore be almost any material with attractive optical properties, including amorphous materials such as glasses (e.g. chalcogenide), crystals, ceramics, metals, or semiconductors.

Suppose, for an example of this calculation, that an optical design requires use of a transparent material with a refractive index of 1.90 for a lens working at the wavelength of 4.0 microns in the infrared. Compiled lists of the common infrared optical materials include no candidates between Cesium Iodide at an index of 1.75 and Silver Chloride with an index of 2.00 (Tosi, op. cit.). But two readily available materials are Potassium Bromide, with an index of 1.54 and a Lorentz-Lorenz ratio of 0.3138, and Germanium, with an index of 4.00 and a Lorentz-Lorenz ratio of 0.8333. The Lorentz-Lorenz ratio needed for the composite refractive index of 1.90 is 0.4652. Using the well-known mixing formula stated above, the volume can be calculated as a proportion f of Potassium Bromide and the volume proportion (1−f) of Germanium, which are related by the equation:

$$P=\Sigma ViPi=0.3138f+0.8333(1-f)=0.4652$$

By solving for f, we calculate that a finely divided uniform mixture of f=70.86% by volume of Potassium Bromide, together with (1−f)=29.14% by volume of Germanium, can be compacted to provide the desired refractive index of 1.90. Because we want the compacted material to cohere as a solid object, it is favorable that Potassium Bromide, an excellent matrix-forming material, represents a majority (70.86%) of the final volume. For convenience in measuring the quantities to be mixed, these volume proportions can be converted easily to weight proportions by use of the respective densities of the two materials. Because the two component refractive indices in this example are greatly different from each other, it will be especially important to keep the particle sizes small to reduce optical scattering.

The same mixing calculation can be applied to combinations of three or more materials that may be needed at times to obtain desired refractive indices at two or more different wavelengths. In using such a mixture of optical materials we might follow the same classical specific steps tabulated above for potassium bromide, but with the first two steps being carried out separately for each of the two or more constituents of the mixture, and with steps (3) and (5) understood to apply to the uniform mixture of the finely divided constituents.

For use with visible light there are a variety of useful glass materials with a refractive index that is deliberately varied with position within a lens blank. Three basic types are used, with gradients that are spherical, radial, or axial, with index gradients that may range from 1% to 25% or 30% of the base index of refraction. (Shannon, R. R., The Art and Science of Optical Design, Cambridge (1997), pp. 595-6) These materials offer additional capabilities to the lens designer, and software provided by Optical Research Associates, Pasadena, Calif., by Zemax Development Corporation, Bellevue, Wash., and by other firms enables designers to make good use of this feature. In some cases graded index optical materials may replace aspheric surfaces in lenses. (Kingslake, R., Optical System Design, Academic Press (1983), p. 3.) Graded index optical products are available commercially from the Gradient Lens Corp. of Rochester, N.Y.

In the infrared, a graded index material formed by vapor deposition of varying proportions of Germanium oxide and Silicon oxide is commonly used to form optical fibers, but few materials have been available for use in infrared lenses. This inventive new means of lens or lens blank, fabrication by low-temperature compression of finely divided solid materials now offers attractive new options for making graded index materials. Three of the most popular materials for forming a solid matrix by compression are potassium bromide, potassium chloride, and cesium iodide, with respective refractive indices of about 1.53, 1.45, and 1.74 in the useful wavelength region from 8 to 13 microns. These materials may be combined with each other in any proportions without compromising their mechanical strength after compression, but other materials could be used. For any desired index within this large range, the Lorentz-Lorenz formula will provide the mixing ratio needed to achieve it with two or more of these ingredients.

For an example, suppose that a lens (or a lens blank for later optical finishing) is needed with an axial refractive index gradient ranging from 1.48 at one surface to 1.50 at the other. Such an object can be made by pre-mixing batches of these powdered materials with refractive indices at any number of steps from 1.48 through 1.50, using enough steps so that the index change at each one is small enough to be acceptable. The cylinder is then filled with these mixed powders one layer at a time, each layer being gently dusted through a screen to distribute it evenly across the area of the cylinder, and each layer weighed or otherwise measured to control the quantity of powder in it. The compression plunger is inserted into the cylinder, air is removed, and the powder is compressed as before to form a solid object. Because there is independent control of the quantity of each mixture added, the refractive index gradient can have any required mathematical form. If necessary an apparatus can easily be built to dispense the mixed powders in an essentially continuous manner, rather than in a series of small steps, to make the index gradient as smooth as may be desired. Spherical and radial gradient index distributions are more complicated to construct, but can be produced in much the same way by depositing measured quantities of the successive mixed powders into the appropriate places within the compression cylinder.

Most metal halide materials and some of the other materials useful for infrared optical components are hygroscopic to some degree, but according to known art they can be protected from the atmosphere by a thin evaporated coating of magnesium fluoride or a suitable polymer. Magnesium fluoride was historically applied by John Strong to protect the surfaces of alkali halide prisms (an expired US patent). Strong also suggested the use of lacquer to protect faces of such a prism. (Op. cit., page 88, FIG. 40.)

A protective polymer coating can be applied by evaporative deposition coating, or by reactive vapor coating, as exemplified by the paraxylylenes. Paralene or Parylene can be applied conformally to a thickness of just a few microns on all sides of an optical component through a dimer-monomer-polymer process, offered commercially by Parylene Coating Services, Inc., of Katy, Tex., and illustrated at http://www.paryleneinc.com/process.html, and in such a thin layer can combine moisture protection with adequate spectral transmission across a broad optical and infrared spectrum.

A protective moisture barrier can alternatively be provided by polyvinylidene chloride (PVDC, or Saran "Classic") resins and films. Saran "Classic" can be applied by dipping the optical component or spin-coating it from a solvent, such as a 60%140% mixture of tetrahydrofuran (THF) and toluene (TOL), using a preparation identified as IXAN PNE 613 supplied by SolVin S.A. of Brussels, Belgium. Or the optical component can be protected by placement between two layers of thin film PVDC material in a mechanical cell designed to permanently hold the two layers tightly together around the entire perimeter of the component.

The protective moisture barrier can be configured as a heat-sealed thin film protective envelope, perhaps of polyethylene (PE). An enclosure much like a commercial vacuum-formed "blister" package may work well. Across the useful 8 to 14 micron infrared range, even a 150-micron thick film of polyethylene can transmit more than 60%, but a much thinner layer will protect against moisture. A transmission spectrum of "Classic" Saran (PVDC) showing its large practical wavelength range in the infrared is given in: http://www.shimadzu.com.br/analitica/aplicacoes/FTIR/A323. pdf, and is reproduced here as FIG. 3 from Shimadzu Corporation, Tokyo, illustrating the useful infrared spectral transmission range of "Classic" Saran (PVDC). The reciprocal scale on the x-axis extends from 2.5 microns (2500 nanometers) wavelength at the left to 20 microns (20,000 nanometers) wavelength at the right. This material is also clear in visible light and for a useful range into the ultraviolet as well. FIG. 4 displays the measured transmission spectrum of "Premium" Saran (PE), in the form of a film about 12 microns thick, which offers generally better spectral transmission than PVDC, and can also be used as a protective envelope, but is less suitable than PVDC for dip coating or spin coating. The approximately sinusoidal transmission variation in FIG. 4 is not caused by absorption in the film material, but represents optical interference between beams reflected from the film surfaces, a phenomenon also responsible for the colors seen on soap bubbles and sometimes called a "channeled spectrum". This phenomenon can be avoided if desired by vacuum-sealing the encapsulating protective film tight against the surfaces of the lens as it is being applied.

However encapsulated, the optical component can still be held with sufficient mechanical precision through the thickness of the moisture barrier to provide sufficient tilt and centering control in an optical system. If the moisture barrier is embodied as a film to envelope the optical component, those skilled in the art will understand that the precision mechanical support may be designed with a plurality of grooves in the contact surfaces to allow clearance for folds and wrinkles of the film material proximate the optical component, but that the film may be hermetically sealed against itself by pressure from a continuous mechanical contact at some convenient distance from the optical component.

A useful protective moisture barrier with adequate spectral transmission can also be formed by a "wet" process such as dip coating, spin coating, brushing, spraying, or electrostatically painting the optical component with a sufficiently thin layer of a polymer (such as PVDC) diluted in a solvent, or even with a two-component polymerizing liquid of low viscosity.

It will be understood that two or more optical components made of materials with possibly different spectral and thermal properties may be placed together, aspheric or not, as is familiar in traditional lens design, to achieve any desired cancellation or enhancement of aberrations or of spectral or thermal characteristics within the optical system, and that such components may most conveniently be combined within a single moisture barrier.

Optionally, the hygroscopic optical component or components can be mounted between non-hygroscopic lenses or windows in a sealed cell if the design permits.

The silver halides will gradually darken if exposed to visible or ultraviolet light, so should be protected with a suitable spectral filter when appropriate, possibly provided by incorporating one or more dyes or pigments directly into the moisture barrier material.

Apart from a typical lensing application, other applications for the lenses of this invention include, but are not limited to, cubic phase masks lacking rotational symmetry for controlling wavefront shapes, and high NA camera objectives for use in the recently developed uncooled bolometer imaging arrays.

When a flat pellet is compressed in the conventional manner for solid matrix sampling spectroscopy, transmission measurements may be made through it while it is still mounted in a metal ring forming part of the die body, or the pellet may be pushed out of the die without concern for fractures of the compressed solid material around the edge. For lens manufacture a superior practice will be to facilitate removal of the compressed object from the die by providing a draft angle to the restraining die surface in which the lens is formed. To avoid problems with the compression process, a useful embodiment (Refer to FIG. 5) uses a thin inserted molded plastic or formed metal liner 14 that can be removed from the die body 16 along with the lens 18 that is compacted within it by action of the plunger 20 toward the anvil 22 of FIG. 5. Note that the removable plastic or metal liner 14 preferably has a draft angle on its outer surface that facilitates removal of the liner 14 and the lens 18, as an assembly, from the die body 16. The lens and liner together will be suitably coated or wrapped to protect the lens from humidity. A vacuum port can easily be added to the die body 16 if it is needed for removal of air.

Another embodiment of the invention that avoids damage to the compressed lens and simplifies manufacture uses as a die body a removable molded or machined mechanical part 24 that is itself a permanent mount for the compacted lens, which may then be installed directly into a camera or other instrument, or into which additional lens elements 26 (typical) may be inserted to complete a compound optical system, as shown in FIGS. 6a and 6b. As before, lens 18 is formed by compaction between plunger 20 and anvil 22. A vacuum port can be added if it is needed. Again, the lens and mount together can be coated for moisture protection, or in the assembly illustrated, the mount can be held in a dry atmosphere while the outer lens elements are hermetically sealed into the structure. Also, the mount can be made of material transparent (e.g., acrylic or polycarbonate) in the visible to aid in inspection.

Damage can alternatively be avoided while keeping the lens size to a minimum by constructing the die body so that it is split into two or more sections. Those sections are clamped solidly together to form a complete die while the powder is being compressed, but can be unclamped and separated laterally from the compacted lens, which is then simply lifted away.

Having described the invention with reference to particular embodiments, other variations will occur to those skilled in the art based on its teachings. For example, the vacuum and sometimes the drying steps of the fabrication method may be left out in appropriate cases provided results still are sensible for scattering properties. This will depend on how much pressure is available to squeeze down any residual air bubbles, and whether water has any troublesome absorbing properties in the wavelength range of interest. Therefore, it is intended that all such variants be within the scope of the invention as defined by the appended claims.

What is claimed is:

1. Optical component forming materials comprising at least one finely ground metal halide powder that, under compression and at temperatures lower than its melt temperature, is capable of being formed into a cohesive monolithic mass having low scattering and high transmission over predetermined wavelengths and operating conditions.

2. The optical component forming materials of claim 1 wherein said temperature lower than its melt temperature is in the range from about 40° F. to about 520° F.

3. The optical component forming material of claim 1 wherein said material is transmissive in at least one of the ultraviolet, visible, and infrared regions of the spectrum.

4. The optical component forming material of claim 1 comprising an admixture of a metal halide host matrix material and at least one other material having optical properties which, when mixed with said host matrix, provide the optical component with predetermined optical and physical properties.

5. The optical component material of claim 4 wherein said host matrix material possesses the properties of high surface energy density, flowability, and deformability.

6. The optical component forming material of claim 4 wherein said host matrix material is selected from the group consisting of potassium bromide, potassium chloride, and cesium iodide.

7. The optical component forming material of claim 4 wherein said host matrix material is present in sufficient concentration to provide optical components with said monolithic properties and said other material is present in concentrations over 2%.

8. The optical component forming material of claim 4 wherein said admixture is selected from the group of materials consisting of IR transmitting materials.

9. The optical component forming material of claim 8 wherein said IR materials is selected from the group consisting of alkali and metal halides and amorphous glasses.

10. The optical component forming material of claim 8 wherein said other material comprises germanium.

11. An optical component formed of at least one finely ground metal halide powder compressible at temperatures lower than its melt temperature to a cohesive monolithic mass having low scattering and high transmission over predetermined wavelengths and operating conditions.

12. The optical component of claim 11 wherein said temperature lower than its melt temperature is in the range from about 40° F. to about 520° F.

13. The optical component of claim 11 selected from the group including prismatic elements, spherical lenses, aspherical lenses, cylindrical lenses, graded index lenses, lens blanks, wavefront shaping elements, aspheric add-ons, spherical and aspherical lens arrays, arrays of parallel lying cylindrical lenses, diffractive structures, diffraction gratings, holograms, Fresnel lenses, axicons, joined clusters of prisms, and combinations thereof.

14. The optical component of claim 11 further including a plastic or metal liner in part surrounding the optical component and in part inserted in a compression die while the optical component is being compressed, said liner being removable along with the optical component as a unit after the optical component has been formed into a monolithic mass.

15. The optical component of claim 14 wherein said plastic or metal liner is further configured to serve as a lens mount for the optical component.

16. The optical component of claim 15 wherein said lens mount is further configured for mounting at least one other optical component with respect to said monolithic mass.

17. The optical component of claim 11 comprising compressed finely ground powder comprises potassium bromide and germanium mixed by volume in the ratio of 70.86 to 29.14, respectively.

18. The optical component of claim 11 wherein said finely ground powder comprises an admixture of a metal halide host matrix material and at least one other material having optical properties which, when mixed with said host matrix, provide the optical component with predetermined optical and physical properties.

19. The optical component of claim 18 wherein said host matrix material possesses the properties high surface energy density, flowability, and deformability.

20. The optical component of claim 19 wherein said host matrix material is selected from the group consisting of potassium bromide, potassium chloride and cesium iodide.

21. The optical component of claim 19 wherein said host matrix material is present in sufficient concentration to provide the optical component with said monolithic properties and said other material is present in concentrations over 2%.

22. The optical component of claim 20 wherein said admixture is selected from the group of materials consisting of IR transmitting materials.

23. The optical component of claim 22 wherein said IR materials are selected from the group consisting of alkali and metal halides and amorphous glasses.

24. The optical component of claim 11 wherein said optical component also comprises germanium.

25. The optical component of claim 11 further including at least part of a die body, removable along with the optical component as a unit after the optical component has been formed into a monolithic mass, wherein said at least part of said die body is configured to serve as a lens mount for at least the optical component.

* * * * *